United States Patent
Elfert et al.

(10) Patent No.: US 10,495,147 B2
(45) Date of Patent: Dec. 3, 2019

(54) ROLLING BEARING, WIND TURBINE, AND METHOD FOR OPERATING A ROLLING BEARING

(71) Applicants: THYSSENKRUPP ROTHE ERDE GMBH, Dortmund (DE); thyssenkrupp AG, Essen (DE)

(72) Inventors: Gunther Elfert, Erwitte (DE); Stefan Löffler, Bönen (DE); Bernd Lüneburg, Mülheim (DE); Jörg Rollmann, Lippstadt (DE)

(73) Assignees: THYSSENKRUPP ROTHE ERDE GMBH, Dortmund (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/071,594

(22) PCT Filed: Jan. 25, 2017

(86) PCT No.: PCT/EP2017/051465
§ 371 (c)(1),
(2) Date: Jul. 20, 2018

(87) PCT Pub. No.: WO2017/129578
PCT Pub. Date: Aug. 3, 2017

(65) Prior Publication Data
US 2019/0032716 A1    Jan. 31, 2019

(30) Foreign Application Priority Data

Jan. 26, 2016  (DE) .................. 10 2016 101 276
Sep. 23, 2016  (DE) .................. 10 2016 118 054

(51) Int. Cl.
*F16C 33/66* (2006.01)
*F16C 19/38* (2006.01)

(52) U.S. Cl.
CPC ........ *F16C 33/6607* (2013.01); *F16C 19/385* (2013.01); *F16C 33/6622* (2013.01); *F16C 2300/14* (2013.01); *F16C 2360/31* (2013.01)

(58) Field of Classification Search
CPC .............. F16C 33/6607; F16C 33/6629; F16C 33/6681
See application file for complete search history.

(56) References Cited

U.S. PATENT DOCUMENTS

| | | | |
|---|---|---|---|
| 2,045,026 A | 6/1936 | Rosendahl | |
| 2,848,284 A | 6/1957 | Atkinson | |

(Continued)

FOREIGN PATENT DOCUMENTS

| | | |
|---|---|---|
| CN | 101846129 A | 9/2010 |
| CN | 102102762 A | 6/2011 |

(Continued)

OTHER PUBLICATIONS

English Translation of International Search Report issued in PCT/EP2017/051465, dated Apr. 4, 2017(dated Apr. 13, 2017).

*Primary Examiner* — Thomas R Hannon
(74) *Attorney, Agent, or Firm* — thyssenkrupp North America, Inc.

(57) ABSTRACT

A rolling bearing with an inner ring and an outer ring which is rotatable about a rotation axis relative to the inner ring, or with an outer ring and an inner ring which is rotatable about a rotation axis relative to the outer ring, and with at least one sealing element arranged between the inner ring and the outer ring for sealing an interior of the rolling bearing which can be filled with a lubricant. The rolling bearing includes a conveying element for conveying the lubricant which is arranged on the one of the inner ring and outer ring so as to be rotatable about the rotation axis of the rolling bearing and (Continued)

in such a way that a play exists between the conveying element and the other of the inner ring and outer ring.

17 Claims, 4 Drawing Sheets

(56) References Cited

U.S. PATENT DOCUMENTS

| | | | | |
|---|---|---|---|---|
| 5,312,191 | A * | 5/1994 | Gallant | F16C 33/6651 384/468 |
| 6,324,899 | B1 | 12/2001 | Discenzo | |
| 7,635,225 | B2 * | 12/2009 | Lajiness | F16N 7/363 384/462 |
| 8,465,207 | B2 * | 6/2013 | Maier | F16C 32/0442 384/465 |
| 2015/0240872 | A1 | 8/2015 | Ito | |

FOREIGN PATENT DOCUMENTS

| | | |
|---|---|---|
| DE | 901 359 C | 1/1954 |
| DE | 43 29 398 A | 7/1994 |
| DE | 202008001286 U | 3/2008 |
| DE | 102012215217 A | 3/2013 |
| DE | 10 2013 216 140 A | 2/2015 |
| EP | 2 620 642 A | 7/2013 |
| EP | 2 762 737 A | 8/2014 |
| GB | 697 797 A | 9/1953 |
| GB | 2 453 041 A | 3/2009 |
| JP | 200428306 A | 1/2004 |
| JP | 2015-158227 A | 3/2015 |
| JP | 2015224701 A | 12/2015 |
| WO | 2010/040027 A | 4/2010 |
| WO | 2011/064002 A | 6/2011 |
| WO | 2014/037193 A | 3/2014 |

* cited by examiner

ROLLING BEARING, WIND TURBINE, AND METHOD FOR OPERATING A ROLLING BEARING

CROSS REFERENCE TO RELATED APPLICATIONS

This application is a U.S. National Stage Entry of International Patent Application Serial Number PCT/EP2017/051465, filed Jan. 25, 2017, which claims priority to German Patent Application No. DE 10 2016 101 276.9, filed Jan. 26, 2016, and German Patent Application No. DE 10 2016 118 054.8, filed Sep. 23, 2016, the entire contents of which are incorporated herein by reference.

FIELD

The present disclosure generally relates to a rolling bearing with an inner ring, an outer ring which is rotatable about a rotation axis relative to the inner ring.

BACKGROUND

A wind turbine with a nacelle, a rotor and a rolling bearing via which the rotor is rotatably connected to the nacelle, wherein the rolling bearing includes either an inner ring connected non-rotatably to the nacelle and an outer ring which is rotatable about a rotation axis relative to the inner ring and is connected non-rotatably to the rotor, or an outer ring connected non-rotatably to the nacelle and an inner ring which is rotatable about a rotation axis relative to the outer ring and is connected non-rotatably to the rotor, and with at least one sealing element arranged between the inner ring and the outer ring for sealing an interior of the rolling bearing which can be filled with a lubricant.

Rolling bearings usually have an inner ring and an outer ring which is rotatable about a rotation axis relative to the inner ring. Such rolling bearings are typically filled with a lubricant, e.g. a grease or an oil, via which excessive wear of contact points inside the rolling bearing can be countered. In order to seal the lubricant-filled interior of the rolling bearing, and hence prevent as far as possible any undesirable escape of lubricant, usually a sealing element is provided between the inner ring and the outer ring.

Such sealing elements have proved successful in practice. However, in particular in cases in which a local surplus of lubricant or a locally increased pressure exists in the rolling bearing, often lubricant leaks through the existing sealing elements. Such lubricant leakages reduce the lubricant supply in the rolling bearing, so it is necessary to service the rolling bearing at regular intervals in order to check the lubricant quantity present in the rolling bearing and replace lubricant if necessary.

Thus a need exists to extend the maintenance intervals of rolling bearings.

DETAILED DESCRIPTION

Figure 1:
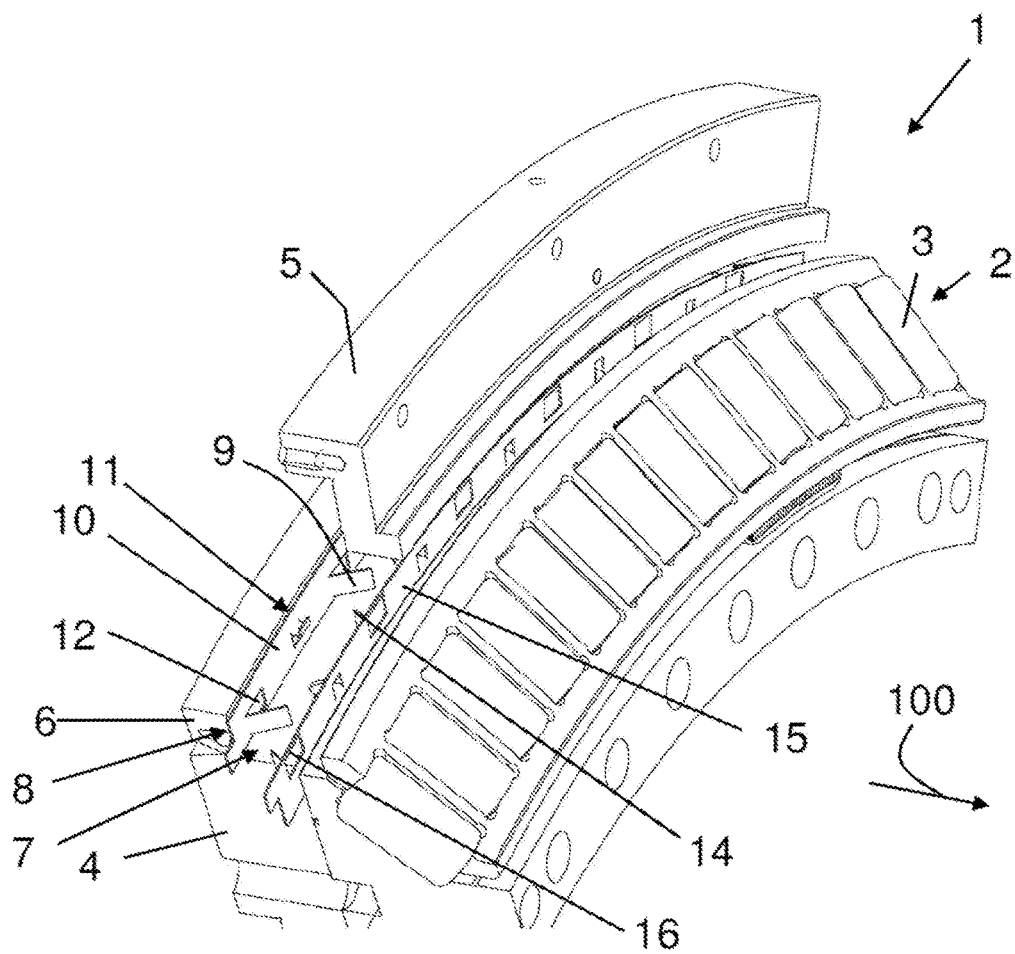
FIG. 1 is a perspective sectional view of an exemplary embodiment of a rolling bearing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention concerns a rolling bearing with an inner ring, an outer ring which is rotatable about a rotation axis relative to the inner ring, and at least one sealing element arranged between the inner ring and the outer ring for sealing an interior of the rolling bearing which can be filled with a lubricant. A further aspect of the invention is a rolling bearing with an outer ring, an inner ring which is rotatable about a rotation axis relative to the outer ring, and at least one sealing element arranged between the inner ring and the outer ring for sealing an interior of the rolling bearing which can be filled with a lubricant. Furthermore, the invention concerns a method for operating a rolling bearing with an inner ring, an outer ring which is rotatable about a rotation axis relative to the inner ring, and at least one sealing element arranged between the inner ring and the outer ring for sealing an interior of the rolling bearing which can be filled with a lubricant. Also, the invention concerns a rolling bearing with an outer ring and an inner ring which is rotatable about a rotation axis relative to the outer ring, and with at least one sealing element arranged between the inner ring and the outer ring for sealing an interior of the rolling bearing which can be filled with a lubricant.

In some examples, the rolling bearing includes a conveying element for conveying the lubricant, which is arranged on the one of the inner ring and outer ring so as to be rotatable about the rotation axis of the rolling bearing and in such a way that a play exists between the conveying element and the other of the inner ring and outer ring.

The conveying element allows the lubricant present in the rolling bearing, in particular grease or oil, to be circulated so that it is possible to dissipate local lubricant surpluses and/or local pressure increases in the interior, in particular in the region of the inside of the sealing element. The conveying element is arranged on the one of the inner ring and outer ring, wherein a play exists between the conveying element and the other of the inner ring and outer ring. The play between the conveying element and the inner ring or outer ring, which is movable relative to the conveying element, defines a region in which lubricant present cannot be picked up and/or conveyed by the conveying element. Thus a predefined quantity of lubricant may remain in the region in front of the sealing element, so that the function capacity of the sealing element is not reduced. Also, due to the play, possible wear on the conveying element from contact with the inner ring or outer ring, which is movable relative to the conveying element, is countered. Furthermore, deformations of the inner ring and/or outer ring may be absorbed by the play. The conveying element thus allows the distribution of lubricant in the interior of the rolling bearing to be balanced out. This reduces the danger of lubricant leakages through the sealing element, so that the undesirable escape of lubricant from the rolling bearing is reduced and the maintenance intervals of the rolling bearing may be extended.

The solution according to the invention may be used advantageously in particular in large rolling bearings which have an external diameter of e.g. several meters, and which accordingly contain large quantities of lubricant. With such large rolling bearings, the raceways of the rolling bodies are preferably hardened by induction hardening.

According to an advantageous embodiment, the rolling bearing has at least one scraper element for scraping lubricant from the conveying element. The scraper element may be arranged such that the lubricant conveyed by the conveying element is scraped away from the conveying element by the scraper element. The scraped lubricant may be conducted away from the region of the sealing element via the scraper element.

In this context, it is advantageous if the conveying element is movable relative to the scraper element so that, on a movement of the conveying element relative to the scraper element, in particular past the scraper element, lubricant conveyed by the conveying element may be scraped away by the scraper element.

A preferred embodiment provides that the conveying element is formed blade-like, whereby a good conveying effect may be achieved. Alternatively or additionally, the scraper element may be formed blade-like. According to a different embodiment, the conveying element and/or the scraper element is configured as a paddle or triangle.

It is furthermore preferred if the main extension plane of the conveying element encloses an acute angle with an axial plane of the rolling bearing which includes the rotation axis. Such a tilt of the conveying element relative to the rotation axis allows the lubricant conveyed by the conveying element to be given an additional force component in the axial direction, so that the lubricant is conveyed not only in the circumferential direction but also in the axial direction. Particularly preferably, the acute angle between the conveying element and the axial plane is arranged such that, on movement of the conveying element, the lubricant is conveyed in the direction towards a raceway of the rolling bearing. This allows lubricant to be conveyed away from a sealing element arranged in an edge region of the rolling bearing, so that the distribution of lubricant may also be balanced out in the axial direction. Alternatively or additionally, a main extension plane of the scraper element may enclose an acute angle with an axial plane of the rolling bearing which includes the rotation axis, so that the lubricant may be conducted away in the axial direction by means of the scraper element.

An embodiment is advantageous in which the conveying element and the scraper element have an opposing tilt relative to an axial plane of the rolling bearing which includes the rotation axis. The opposing tilt allows an improvement in the diversion of lubricant, scraped away from the conveying element, via the scraper element in the radial direction.

Furthermore, an embodiment has proved advantageous in which a main extension plane of the conveying element is arranged parallel to a radial direction of the rolling bearing, so that the lubricant can be conveyed better in the circumferential direction by means of the conveying element. Alternatively or additionally, a main extension plane of the scraper element may be arranged parallel to a radial direction of the rolling bearing.

Preferably, the scraper element is arranged on the other of the inner ring and outer ring, and a play exists between the scraper element and the one of the inner ring and outer ring. The provision of play between the scraper element and the inner ring or outer ring, which is movable relative to the scraper element, allows a reduction in wear on the scraper element.

An advantageous embodiment of the rolling bearing provides that the rolling bearing comprises several conveying elements, so that the conveying effect may be magnified. Alternatively or additionally, the rolling bearing may also comprise several scraper elements.

Preferably, the rolling bearing comprises several conveying elements which are arranged on a common, in particular annular, first base body. The first base body together with the conveying elements may form a rotatable conveying wheel. The first base body and/or the conveying elements may be made of a metal.

It is furthermore preferred if the rolling bearing comprises several scraper elements which are arranged on a common, in particular annular, second base body. The second base body together with the scraper elements may form a scraper wheel, wherein the conveying wheel is movable relative to the scraper wheel, in particular rotatable about the rotation axis. The second base body and/or the scraper elements may be made of a metal.

An embodiment has proved advantageous in which the second base body has recesses through which lubricant may be conducted from the scraper elements through the base body, in particular in the direction of the rolling bodies of the rolling bearing. The recesses may be formed by punching and subsequent bending of the punched region, wherein the punched region is bent such that it forms the first scraper element. In this way, the scraper element may be produced economically advantageously in terms of production technology. Alternatively or additionally, the first base body may have recesses which are formed by punching and subsequent bending of the punched region, wherein the punched region is bent such that it forms the conveying element.

Preferably, the rolling bearing has two sealing elements arranged between the inner ring and the outer ring for sealing the interior. The sealing elements may be arranged on opposite sides of the rolling bearing so that the interior of the rolling bearing is sealed on both sides. Both sealing elements may be configured as sealing rings.

With a method of the type cited initially, the object is achieved in that the lubricant is conveyed by a conveying element which is arranged on the one of the inner ring and outer ring so as to be rotatable about the rotation axis of the rolling bearing and in such a way that a play exists between the conveying element and the other of the inner ring and outer ring.

The same advantages may be achieved as have already been described in connection with the rolling bearing.

A preferred embodiment of the method provides that the lubricant is conveyed by the conveying element during rotation of the inner ring relative to the outer ring.

In a wind turbine of the type cited initially, the object is achieved in that the rolling bearing has a conveying element for conveying the lubricant, which is arranged on the one of the inner ring and outer ring so as to be rotatable about the rotation axis of the rolling bearing and in such a way that a play exists between the conveying element and the other of the inner ring and outer ring.

The same advantages may be achieved as have already been described in connection with the rolling bearing.

Alternatively or additionally, the advantageous features described in connection with the rolling bearing may also be applied to the wind turbine and the method.

Further details, features and advantages of the invention arise the drawings and from the description below of a preferred embodiment with reference to the drawings. The drawings merely illustrate an exemplary embodiment of the invention which does not restrict the inventive concept.

In the various figures, the same parts always carry the same reference signs and therefore are usually only mentioned or described once.

The depiction in FIG. 1 shows a rolling bearing 1 according to an exemplary embodiment of the invention. The rolling bearing 1 is configured as a large rolling bearing and has a diameter in the range from 1 m to 10 m, preferably from 3 m to 7 m, particularly preferably from 4 m to 6 m. The rolling bearing 1 comprises two raceways 2 which receive conical rolling bodies 3, wherein the depictions each show only one raceway 2. To this extent, the rolling bearing 1 is a double row, tapered roller bearing. The raceways 2 are arranged between an inner ring 4 and an outer ring 5, wherein for greater clarity, the figures do not show the parts of the outer ring 5 lying on the rolling bodies 3. The outer ring 5 is arranged so as to be rotatable relative to the inner ring 4 about a rotation axis arranged parallel to the axial direction, which is shown in FIG. 1 with reference sign 100. The interior 7 of the rolling bearing 1 is also filled with a lubricant in the form of grease. In order to prevent as far as possible an undesirable escape of lubricant from the rolling bearing 1, the rolling bearing 1 has a first sealing element 6. The first sealing element 6 is arranged on an outside of the rolling bearing 1. Furthermore, the rolling bearing has a second sealing element (not shown) which is arranged on the inside of the rolling bearing 1 opposite the outside.

Such rolling bearings 1 may be used for example as rotor bearings in wind turbines. When used as a rotor bearing in this way, the rolling bearing 1 has a preferred direction of rotation and rotates substantially continuously. In order to reduce the downtimes of the wind turbines, it is desirable for such continuously rotating rolling bearings 1 to have maintenance intervals that are as long as possible. To extend the maintenance intervals, special measures are taken in relation to the rolling bearing 1. The rolling bearing 1 has a conveying device 8 arranged in the interior 7 for conveying the lubricant. The conveying device 8 is configured purely mechanically and ensures that, because of a rotation of the outer ring 5 relative to the inner ring 4, the lubricant inside the rolling bearing 1 is circulated so that existing uneven distributions of lubricant in the region in front of the first sealing element 6 may be dissipated. This reduces the danger of lubricant leakage through the first sealing element 6, so that the undesirable escape of lubricant from the rolling bearing is reduced and the maintenance intervals of the rolling bearing may be extended.

The rolling bearings 1 described above often have an outer diameter of over 1 m, frequently over 2 m. These rolling bearings therefore also contain a large quantity of lubricant. The invention may therefore effectively prevent the undesirable escape of lubricant and be used advantageously in particular in these large rolling bearings. In these large rolling bearings, the raceways for the rolling bodies are hardened by induction hardening. This hardening method is used in particular in large rolling bearings with an outer diameter of more than 2 m because through-hardening the rings in such large bearings is associated with technical and economic disadvantages.

In the rolling bearing 1 according to the exemplary embodiment, the conveying device 8 comprises a plurality of conveying elements 9 which are arranged so as to be rotatable about the rotation axis of the rolling bearing 1. For this, the conveying elements 9 are arranged non-rotatably on the outer ring 5 so that, on a rotation of the outer ring 5 relative to the inner ring 4, the conveying elements 9 co-rotate with the outer ring 5. The conveying elements 9 are connected integrally to a first base body 10 configured in annular form. The first base body 10 and the conveying elements 9 thus together form a conveying wheel 11 co-rotating with the outer ring 5. The conveying elements 9 are punched out of the first base body 10 and bent inward, so that next to the conveying element 9, a recess 12 is formed which allows the through-flow of lubricant through the first base body 10. In this respect, the conveying wheel 11 constitutes a circulating conveying plate.

The conveying elements 9 are formed substantially blade-like. To this extent, the conveying elements 9 are configured as conveying blades. The conveying elements 9 are made of a rigid material, in particular a metal. They have a main extension plane which is arranged at a tilt to an inner contour of the first base body 10. The main extension plane of the conveying elements 9 is parallel to a radial direction 101 of the rolling bearing 1. Furthermore, the main extension plane of the conveying elements 9 encloses an acute angle with an axial plane of the rolling bearing 1 which includes the rotation axis. In the rolling bearing 1 according to the exemplary embodiment, by the angle of the conveying elements 9 relative to the axial plane, it can be achieved that lubricant is conveyed in the direction away from the first sealing element 6 on a counterclockwise rotation of the conveying elements 9.

Figure 2:
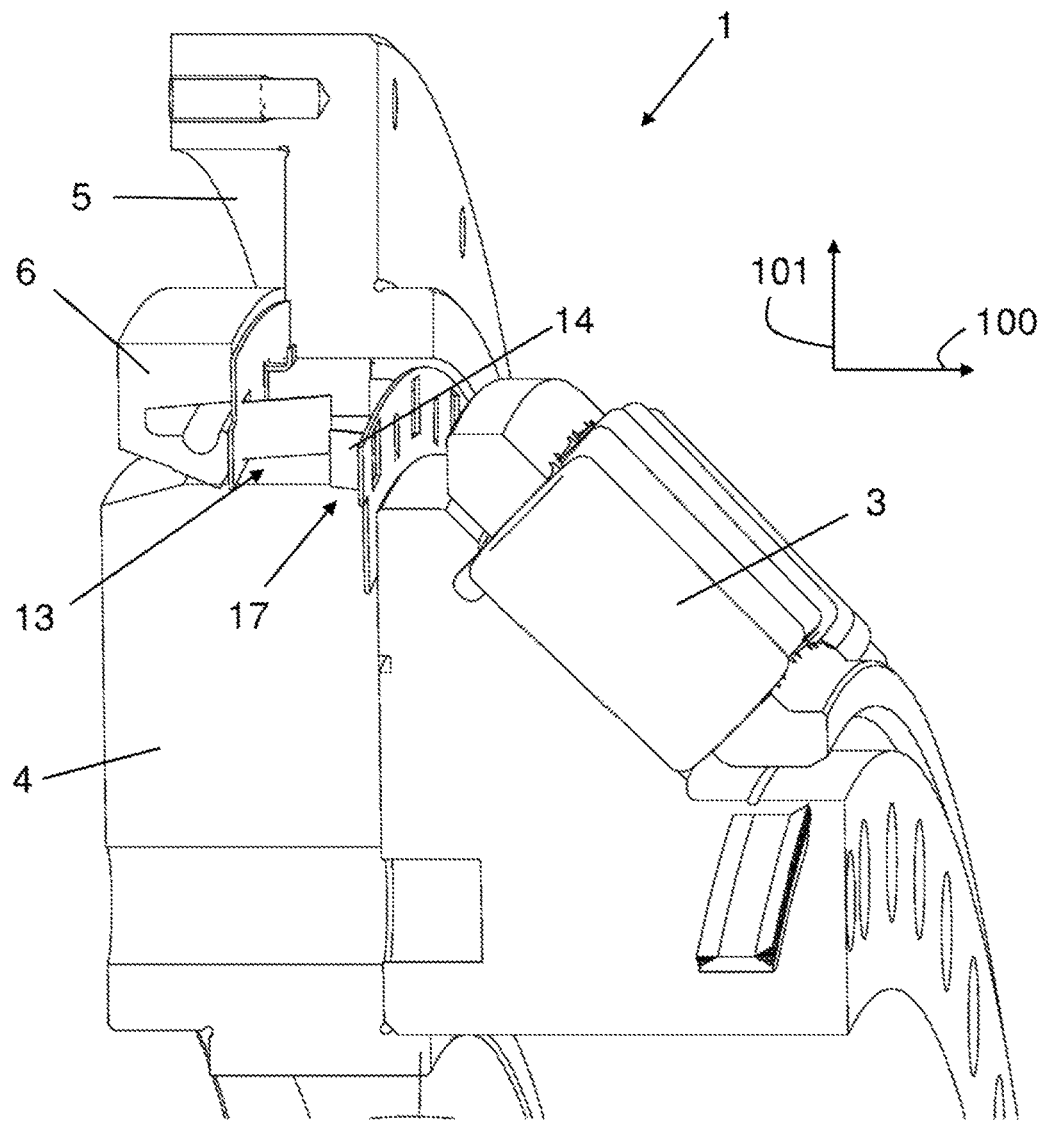
FIG. 2 is a perspective, sectional view of the rolling bearing from FIG. 1 from a second angle.
Figure 3:
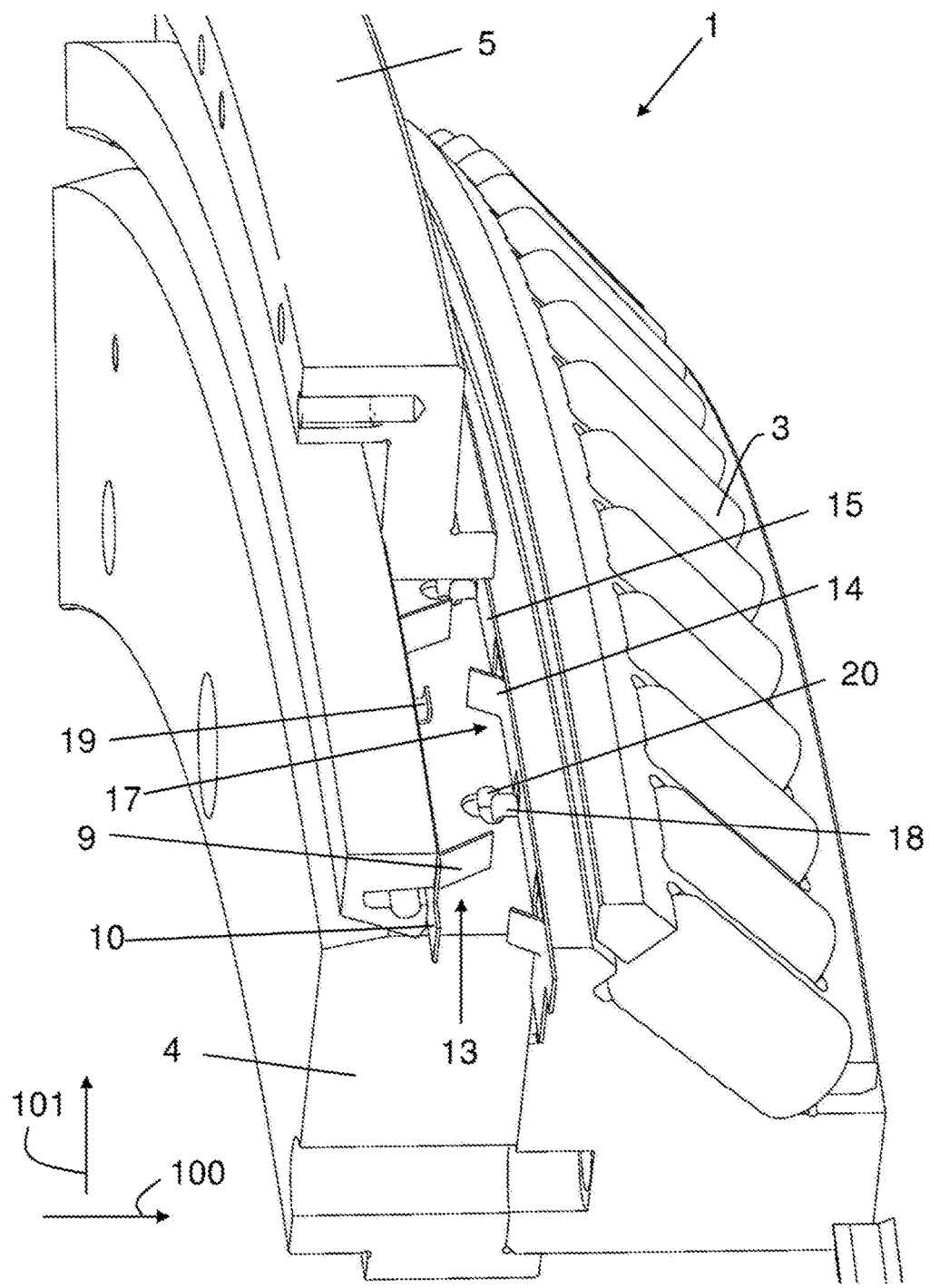
FIG. 3 is a perspective view of the rolling bearing from FIG. 1 from a third angle.
Figure 4:
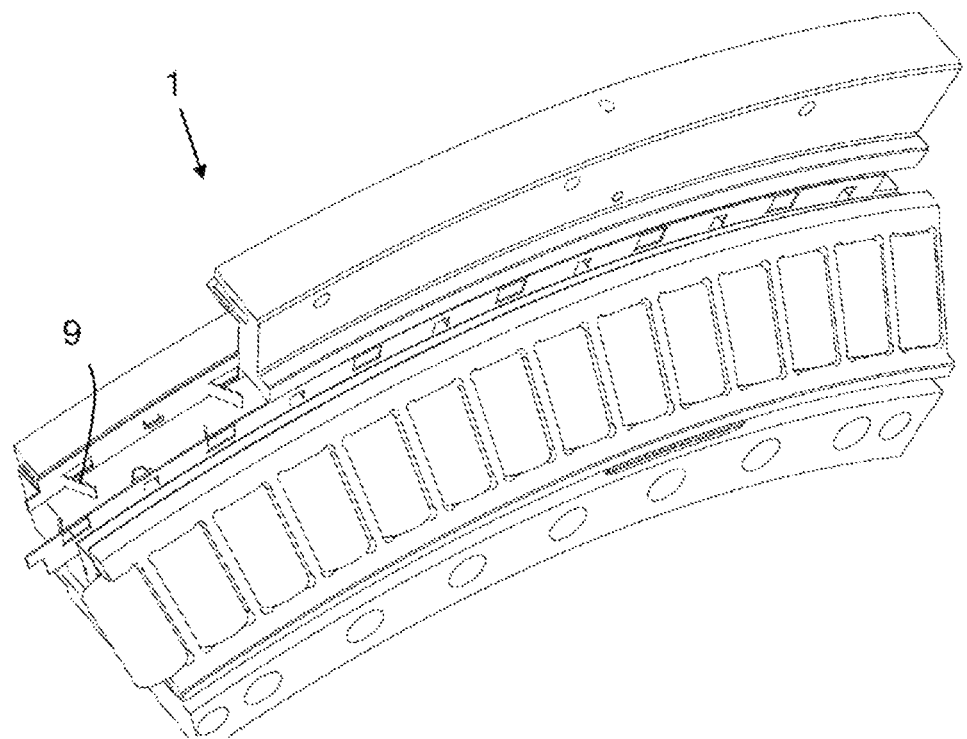
FIG. 4 is a perspective view of the rolling bearing from FIG. 1 from a fourth angle.

As the depiction in FIGS. 2 and 3 shows, the conveying device 8 also comprises a plurality of scraper elements 14 via which lubricant conveyed by the conveying elements 9 may be scraped away. The scraper elements 14 are arranged such that the conveying elements 9 may move relative to the scraper elements 14. For this, the scraper elements 14 are arranged non-rotatably on the inner ring 4. The scraper elements 14 are connected integrally to a second base body 15 configured in annular form. The second base body 15 together with the scraper elements 14 forms a scraper wheel. The scraper elements 14 are formed by punching and bending portions of the second base body 15, so that a recess 16 is arranged in the second base body 15 next to each scraper element 14.

The scraper elements 14 are configured substantially blade-like. The scraper elements 14 are made of a rigid material, in particular a metal. They have a main extension plane which is arranged at a tilt to the inner contour of the second base body 15, wherein the scraper elements 14 are arranged transversely to the conveying elements 9. To this extent, the conveying elements 9 and the scraper elements 14 have an opposing tilt relative to an axial plane of the rolling bearing 1 which includes the rotation axis. The main extension plane of the scraper elements 14 is arranged parallel to a radial direction 101 of the rolling bearing 1. Furthermore, the main extension plane of the scraper elements 14 encloses an acute angle with an axial plane of the rolling bearing 1 which includes the rotation axis. In the rolling bearing 1 according to the exemplary embodiment, by the angle of the scraper elements 14 relative to the axial plane, it can be achieved that lubricant is scraped away from the conveying elements 9 on a rotation of the conveying elements 9 and conducted through the recesses 16 in the direction of the rolling bodies 3.

As FIGS. 2 and 3 furthermore show, the conveying elements 9 are arranged such that a gap 13 remains between the conveying elements 9 and the inner ring 4. The gap 13 provides a play between the conveying elements 9 and the inner ring 4, which ensures that the lubricant arranged in the region in front of the first sealing element 6 is not completely picked up and conveyed away by the conveying element 9, but that a certain quantity of lubricant remains in the region in front of the first sealing element 6. Also, a gap 17 is provided between the scraper elements 14 and the outer ring 5 so that a play exists between the scraper elements 14 and the outer ring 5. To this extent, there is no contact between the conveying elements 9 and the inner ring 4. Nor is there any contact between the scraper elements 14 and the outer ring 5.

The first sealing element 6 is configured as a sealing ring. The second sealing element is also configured as a sealing ring. As FIG. 2 shows, the first sealing element 6 closes the interior 7 against the environment. The first sealing element 6 is connected non-rotatably to the outer ring 5 and lies tightly against the inner ring 4.

FIG. 3 shows a depiction of the rolling bearing 1 according to the exemplary embodiment from an angle which shows a twist-prevention element 18 arranged on the second base body 15, and an axial securing element 19 arranged on the first base body 10.

Via the twist-prevention element 18, the second base body 15 and/or the scraper elements 14 may be secured against an undesirable twisting in the circumferential direction of the rolling bearing 1. The twist-prevention element 18 is configured as a substantially plate-like element which is formed by punching and bending from the second base body 15. A main extension plane of the twist-prevention element 18 is arranged perpendicular to a radial direction 101 of the rolling bearing 1. The twist-prevention element 18 engages in a groove 20 formed on the inner ring 4, so as to achieve a rotationally fixed coupling of the second base body 15 and inner ring 4. Preferably, several twist-prevention elements 18 are arranged on the second base body 15.

The axial securing element 19 is configured as a hook and engages behind a region of the outer ring 5 so that the first base body 10 and/or the conveying elements 9 are fixed by form fit in the axial direction, i.e. in direction 100 of the rotation axis. Preferably, several axial securing elements 19 are arranged on the first base body 10.

The first base body 10 may also comprise one or more twist-prevention elements 18. Alternatively or additionally, one or more axial securing elements 19 may be arranged on the second base body 15.

According to a derivative of the exemplary embodiment shown in the figures, the conveying elements may be connected non-rotatably to the inner ring of the rolling bearing. In such a derivative, the scraper elements are preferably provided on the outer ring of the rolling bearing. In this case, there is no contact between the conveying elements and the outer ring. Furthermore, in this derivative, there is no contact between the scraper elements and the inner ring.

The conveying elements 9 and the scraper elements 14 may also have a form different from that in the exemplary embodiment. For example, it is possible that the conveying elements 9 and/or the scraper elements 14 are configured curved, three-dimensionally paddle-like, or triangular.

According to a further derivative of the exemplary embodiment, the conveying elements 9 may be configured as separate conveying elements 9. For example, it is possible to connect each conveying element to the outer ring 5 individually, or segments may be provided in the rolling bearing which comprise several conveying elements 9 integrally connected together. Also, the scraper elements may be configured as separate scraper elements 14. The scraper elements 14 may be connected to the inner ring 4 individually, or it is possible to provide segments with several scraper elements 14 integrally connected together.

Furthermore, the exemplary embodiment described above may also be used if an oil is contained in the rolling bearing as a lubricant.

Figure 5:
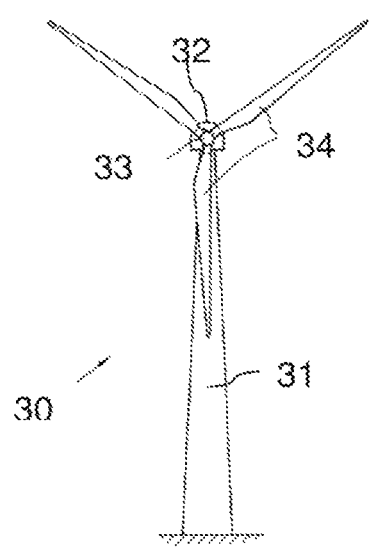
FIG. 5 is an exemplary embodiment of a wind turbine.

FIG. 5 shows an exemplary embodiment of a wind turbine 30 according to the invention. The wind turbine 30 has a tower 31 and a nacelle 32 which is mounted rotatably in azimuth on the tower 31 via an azimuth rotary bearing. A rotor bearing is provided on the nacelle 32, via which bearing a rotor 33 of the wind turbine 30 is connected rotatably to the nacelle 32. The rotor 33 has several, in particular three rotor blades 34.

The rotor bearing of this wind turbine 30 is a rolling bearing 1 as depicted in FIGS. 1 to 4. While the inner ring 4 of the rolling bearing 1 is connected non-rotatably to the nacelle 32, the outer ring 5 of the rolling bearing 1 is connected non-rotatably to the rotor 33. To this extent, the outer ring 5 of the rolling bearing is rotatable about a rotation axis relative to the inner ring 4. Alternatively, the inner ring 4 may be connected non-rotatably to the rotor 33, and the outer ring 5 connected non-rotatably to the nacelle 32. With such an alternative embodiment, the inner ring 4 is rotatable about a rotation axis relative to the outer ring 5.

The rotor bearing of the wind turbine furthermore comprises at least one sealing element 6 arranged between the inner ring 4 and the outer ring 5 for sealing the interior 7 of the rolling bearing 1. The interior 7 may be filled with a lubricant. To convey the lubricant, the rolling bearing 1 has a conveying element 9 which is arranged on the one of the inner ring 4 and outer ring 5 so as to be rotatable about the rotation axis of the rolling bearing 1 and in such a way that a play exists between the conveying element 9 and the other of the inner ring 4 and the outer ring 5.

What is claimed is:

1. A rolling bearing, comprising:
   an inner ring,
   an outer ring configured to rotate about a rotation axis relative to the inner ring or the inner ring configured to rotate about a rotation axis relative to the outer ring,
   a seal arranged between the inner ring and the outer ring, the seal configured to seal an interior of the rolling bearing, and
   a conveying element for conveying a lubricant, the conveying element arranged on one of the inner ring and the outer ring so as to be rotatable about the rotation axis of the rolling bearing and configured to provide play between the conveying element and the other of the inner ring and outer ring, and
   a scraper element for scraping lubricant from the conveying element.

2. The rolling bearing of claim 1, wherein the conveying element is movable relative to the scraper element.

3. The rolling bearing of claim 1, wherein the conveying element and/or the scraper element has a blade-like configuration.

4. The rolling bearing of claim 1, wherein the conveying element and/or of the scraper element defines a main extension plane that encloses an acute angle with an axial plane of the rolling bearing which includes a rotation axis thereof.

5. The rolling bearing of claim 1, wherein the conveying element and the scraper element have an opposing tilt relative to an axial plane of the rolling bearing which includes the rotation axis.

6. The rolling bearing of claim 1, wherein the conveying element and/or the scraper element defines a main extension plane that is arranged parallel to a radial direction of the rolling bearing.

7. The rolling bearing of claim 1, wherein the scraper element is arranged on the other of the inner ring and outer ring, and a play exists between the scraper element and the one of the inner ring and outer ring.

8. The rolling bearing of claim 1, wherein the rolling bearing comprises several conveying elements and/or several scraper elements.

9. The rolling bearing of claim 1, wherein the rolling bearing comprises several conveying elements which are arranged on a common first base body.

10. The rolling bearing of claim 9, wherein the first base body is annular.

11. The rolling bearing of any of claim 1, wherein the rolling bearing comprises several scraper elements which are arranged on a common second base body.

12. The rolling bearing of claim 11, wherein the second base body is annular.

13. The rolling bearing of claim 11, wherein the second base body has recesses through which lubricant can be conducted from the scraper elements through the base body.

14. The rolling bearing of claim 11, wherein the second base body has recesses through which lubricant can be conducted in the direction of a plurality of rolling bodies of the rolling bearing.

15. The rolling bearing of claim 1, wherein the rolling bearing has two sealing elements arranged between the inner ring and the outer ring for sealing the interior.

16. A wind turbine with a nacelle, a rotor and a rolling bearing via which the rotor is rotatably connected to the nacelle, wherein the rolling bearing comprises either:

an inner ring connected non-rotatably to the nacelle, and an outer ring which is rotatable about a rotation axis relative to the inner ring and is connected non-rotatably to the rotor, or an outer ring connected non-rotatably to the nacelle, and an inner ring which is rotatable about a rotation axis relative to the outer ring and is connected non-rotatably to the rotor, a seal arranged between the inner ring and the outer ring configured to seal an interior of the rolling bearing, the interior configured to be provided with a lubricant, and a conveying element for conveying the lubricant, the conveying element arranged on the one of the inner ring and outer ring so as to be rotatable about a rotation axis of the rolling bearing and configured so as to provide play between the conveying element and the other of the inner ring and outer ring, and a scraper element for scraping lubricant from the conveying element.

17. A method for operating a rolling bearing with an inner ring and an outer ring, comprising:

rotating either the outer ring relative to the inner ring or the inner ring relative to the outer ring about a rotation axis, disposing a seal between the inner ring and the outer ring for sealing an interior of the rolling bearing which is configured to be filled with a lubricant, conveying the lubricant with a conveying element arranged on the one of the inner ring or outer ring so as to be rotatable about the rotation axis of the rolling bearing, scraping lubricant from the conveying element with a scraper element, and permitting play between the conveying element and the other of the inner ring and outer ring.

* * * * *